United States Patent [19]

Bowen

[11] 4,145,256

[45] Mar. 20, 1979

[54] METHOD AND APPARATUS FOR PRODUCING A CARBONACEOUS RESIDUE PRODUCT

[75] Inventor: Mack D. Bowen, Smyrna, Ga.

[73] Assignee: Georgia Tech Research Institute, Atlanta, Ga.

[21] Appl. No.: 746,720

[22] Filed: Dec. 2, 1976

Related U.S. Application Data

[63] Continuation of Ser. No. 82,602, Oct. 21, 1970, abandoned, and a continuation of Ser. No. 575,794, May 8, 1975, abandoned, and Ser. No. 701,248, Jun. 30, 1976, abandoned.

[51] Int. Cl.$^2$ .................. C10B 47/24; C10B 49/10; C10B 53/02
[52] U.S. Cl. ............................. 201/25; 201/31; 201/34; 201/39; 201/44; 202/227; 202/253
[58] Field of Search .................. 201/14, 25, 31–34, 201/44, 39; 202/227, 253

[56] References Cited

U.S. PATENT DOCUMENTS

| | | | |
|---|---|---|---|
| 706,443 | 8/1902 | Naet ................................ | 201/39 X |
| 1,383,888 | 7/1921 | Wells ............................... | 201/34 X |
| 1,510,730 | 10/1924 | Wilcox ............................. | 201/34 X |
| 1,524,784 | 2/1925 | De Bartolomeis ................ | 201/19 |
| 1,603,793 | 10/1926 | Otto ................................ | 202/253 X |
| 1,785,760 | 12/1930 | Becker ............................. | 202/227 X |
| 3,525,674 | 8/1970 | Barnebey ........................ | 252/421 X |

*Primary Examiner*—Morris O. Wolk
*Assistant Examiner*—Michael S. Marcus
*Attorney, Agent, or Firm*—Newton, Hopkins & Ormsby

[57] ABSTRACT

A carbonaceous residue or char having novel properties is produced from particulate agricultural waste material, such as peanut shells, which upon heating exhibits an exothermic decomposition into an off gas component and a solid component in which the off gas component is more highly reactive to oxygen than is the solid component. By introducing air into the reaction zone whereat the decomposition is effected and controlling the amount of air so introduced such that not all of the off gas component may be oxidized, the preferential reaction of the air with the off gas component will protect the solid component from any significant oxidation while at the same time it will elevate the temperature in the reaction zone sufficiently to effect substantially complete decomposition of the material so that the recovered product is of very high carbon content. At the same time, a temperature gradient is established in the reaction zone which will allow some of the vapor component of the decomposition (i.e. heavier tars) to condense on the solid component at cooler regions for subsequent reintroduction into the high temperature regions so that the latent carbon content of these tars may also be recovered. The throughput or residence time of the material through the reaction zone and the amount of air introduced (to control the maximum reaction temperature as well as the temperature gradient) are controlled in related manner to recover more or less of the heavier tar residue.

2 Claims, 5 Drawing Figures

METHOD AND APPARATUS FOR PRODUCING A CARBONACEOUS RESIDUE PRODUCT

This is a continuation of application Ser. No. 82,602, filed Oct. 21, 1970 and now abandoned, and of application Ser. No. 575,794, filed May 8, 1975 and now abandoned, and of application Ser. No. 701,248, filed June 30, 1976 and now abandoned.

BACKGROUND OF THE INVENTION

Peanut shells as an agricultural waste material represent a serious disposal problem to processing plants. The most common form of disposal is incineration, but the emissions from these incinerators are of extremely high volume and it is moreover expensive to operate them due to the necessity for frequent replacement of the refractory linings of the incinerators. Contemporarily, the disposal problem associated with peanut shells is difficult, but in the near future will become acute with the passage of federal and state regulations governing air pollution.

Other methods of disposal have been attempted, such as burial and use as a livestock feed filler, but have proven unsatisfactory primarily for the reasons that tremendous bulk quantities are involved and, moreover, the peanut shells contain a residual pesticide content. Beside the problem of the bulk involved, burial transmits the residual pesticide to the soil, which is undesirable. If the peanut shells are used for livestock feed fillers, the livestock ingest the residual pesticide content. In any use which involves transportation of the peanut shells, the question of their sheer bulk represents a considerable cost factor.

BRIEF SUMMARY OF THE INVENTION

The present invention is directed to method and apparatus by means of which agricultrual waste material such as peanut shells may be converted to carbonaceous product having novel and useful properties.

Material, such as peanut shells, which exhibits destructive decomposition in which a decomposition component is an off gas which is more highly reactive to oxygen than is the carbonaceous solid residue or char, may be converted to a novel and useful product which is of high carbon content.

The product is useful as a fuel, for example, or it may be used as a filter material, being highly satisfactory for the latter purpose because of the inherently high surface area per unit weight of the resultant product.

The method according to this invention involves the concept of confining the waste material in a reaction chamber wherein the exothermic, self-sustaining decomposition of the material is initiated, followed by the controlled introduction of air into the reaction zone so that the temperature is elevated ultimately to yield the desired product but with the control of air introduced being such that its preferential reaction with the off gas prevents any significant reaction with the desired product. This is accomplished by avoiding the introduction of that amount of air which would be effective fully to oxidize the off gases. Thus, even though the recovered product is itself so highly reactive that it requires cooling to a temperature below about 240° F. to prevent its ignition when exposed to the atmosphere outside the reaction chamber, no significant oxidation of the product occurs in the reaction chamber even though local temperature therein may exceed 2700° F.

DETAILED DESCRIPTION OF THE INVENTION

Figure 1:
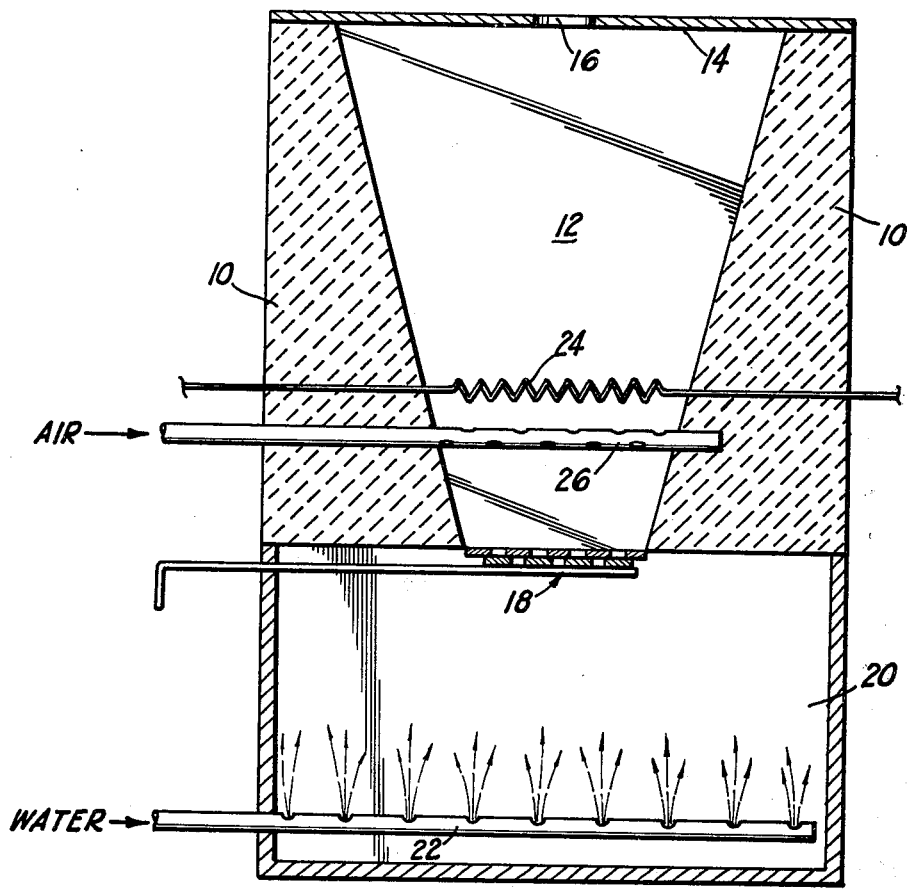
FIG. 1 is a vertical section taken through one embodiment of the invention.

To illustrate an apparatus for carrying out the basic principles of the method of this invention, reference is had to FIG. 1 wherein a body 10 of suitable refractory material is so formed as to provide a generally hopper-like reaction chamber 12. The bottom of the chamber is provided with a grate assembly 18 which may be manually actuated and the top of the reaction chamber is covered by means of a suitable top plate 14 having an opening 16 which may serve both as a charging opening and as a flue opening for discharging gaseous products, as hereinafter described in detail.

A collection chamber 20 is provided beneath the reaction chamber for receiving the reaction product and a water spray manifold 22 is located within the collection chamber to cool the product below its ignition temperature, as hereinafter explained.

Although the preferred embodiment of apparatus and method involves continuous production techniques, the batch process apparatus of FIG. 1 is disclosed to illustrate that batch as well as continuous operation falls within the broader scope of this disclosure.

The agricultural waste product, in this case peanut shells, is charged into the reaction chamber 12 so as substantially to fill it and, to this end, it will be appreciated that the cover 14 may be removed for this purpose or, the charge may be introduced through the opening 16. Waste materials such as peanut shells contain about 80% by weight cellulose and liguin and also contain pentosans as well as the usual moisture. They are characterized by the fact that upon being heated to a temperature of about 450° F., a self-sustaining exothermic decomposition commences in which an off gas component of this decomposition is extremely reactive with oxygen.

According to the present invention as disclosed in FIG. 1, the self-sustaining decomposition of the peanut shell charge is initiated by briefly energizing the electrical resistance heating wire 24 located near the bottom of the reaction chamber 12. Below this heating element an air inlet manifold 26 is disposed and air is introduced thereby into the reaction chamber in controlled amount. Specifically, the amount of air introduced is such that the oxygen content thereof is not sufficient completely to oxidize the aforesaid off gas component. Therefore, the air reacts preferentially with this off gas component, without any significant oxidation of the solid residue, and at the same time, the reaction temperature is increased substantially so as utlimately to yield the desired char product which migrates to the grate 18 for discharge to the chamber 20. The product is characterized in this way by very high carbon content, in excess of 90% by weight, and by an extremely high surface area per unit weight, in the order of at least about 100 square meters per gram. The product is highly active and will ignite in air at about 240° F. For this reason, the discharged product must be cooled below its ignition temperature as soon as it is discharged from the reaction chamber, the cooling spray 22 being for this purpose.

It will be appreciated that the maximum reaction temperature occurs in the vicinity of the air inlet manifold and that it is in this region whereat the final decomposition and conversion to the end product takes place. Above this region and extending upwardly to the top of the reaction chamber whereat the partially oxidized gaseous products are discharged through the opening 16, a decreasing temperature gradient will exist. As a result, some of the vapor component of decomposition (i.e. heavier tars) will condense on the shells at the level or levels of cooler strata above the air inlet region so that these tars will later decompose and leave a carbonaceous residue when the shells upon which they are condensed migrate to the region whereat the maximum reaction temperature exists. As will be explained later, this effect is important not only in contributing to the novel physical characteristics of the carbonaceous residue or char product, but also provides a mechanism for obtaining a higher yield for the process.

Obviously, the apparatus of FIG. 1 may be charged intermittently to maintain a continuous charge within the reaction chamber and, as well, it will be appreciated that the grate 18 will be manipulated intermittently in any event. It will also be appreciated that the term "air" as used herein is meant to encompass any oxygen-rich gas whose purpose is to raise the reaction temperature to an operative value to yield the novel end product. For this purpose, the maximum reaction temperature achieved by the introduction of the air will be in excess of that temperature which would be attained in its absence and will be, in any event, in excess of about 1000° F. although, for purposes which will be explained later, maximum reaction temperatures much greater than this are preferred.

It is important to note that the rate of air introduction is also related to the rate at which the highly reactive off gas component is evolved, since this off gas in effect protects the product within the reaction chamber from any significant oxidation by virtue of its preferential reaction with the air introduced. For this reason, the air introduction is at a rate less than that which would completely oxidize the off gas.

In a typical batch process utilizing the apparatus of FIG. 1, the refractory housing 10 was preheated to a temperature of approximately 800° F. by operation of the electric heating element 24 and approximately 36 pounds of peanut shells were introduced into the reaction chamber 12. Heating was continued with the heating element 24 until a reaction temperature of 975° F. was obtained, whereupon the power was switched off to the heating unit 24 and the reaction was then sustained and the maximum reaction temperature raised, by the controlled introduction of air through the manifold 26. The maximum reaction temperature was raised to 2410° F. and the residue was periodically shaken down by manipulation of the grate 18. Upon completion of the process, whereupon all of the carbonaceous residue or char was collected in the chamber 20, the residue was inspected and showed no signs of ashes and only a few, individual undecomposed peanut shells. These undecomposed shells dropped through the grate into the collection box upon loading and consequently were not heated at all.

In another test, with the refractory 10 preheated as before, approximately 43 pounds of peanut shells were charged into the chamber 12, the reaction initiated with the electrical heater and then continued and sustained with air injection with the heater power disconnected. Periodic "shakedown" was utilized and the processing time for the entire run was 22 minutes at a maximum reaction temperature of 1810° F.

The carbonaceous residue collected from the above runs, and others, was collected and measured for density and then ground and briquetted, yielding the following densities:

Original shell — 6.4
Carbonaceous residue — 5.5
Powered residue — 29.9
Compacted briquettes — 40.0

All densities being pounds per cubic foot.

Figure 2:
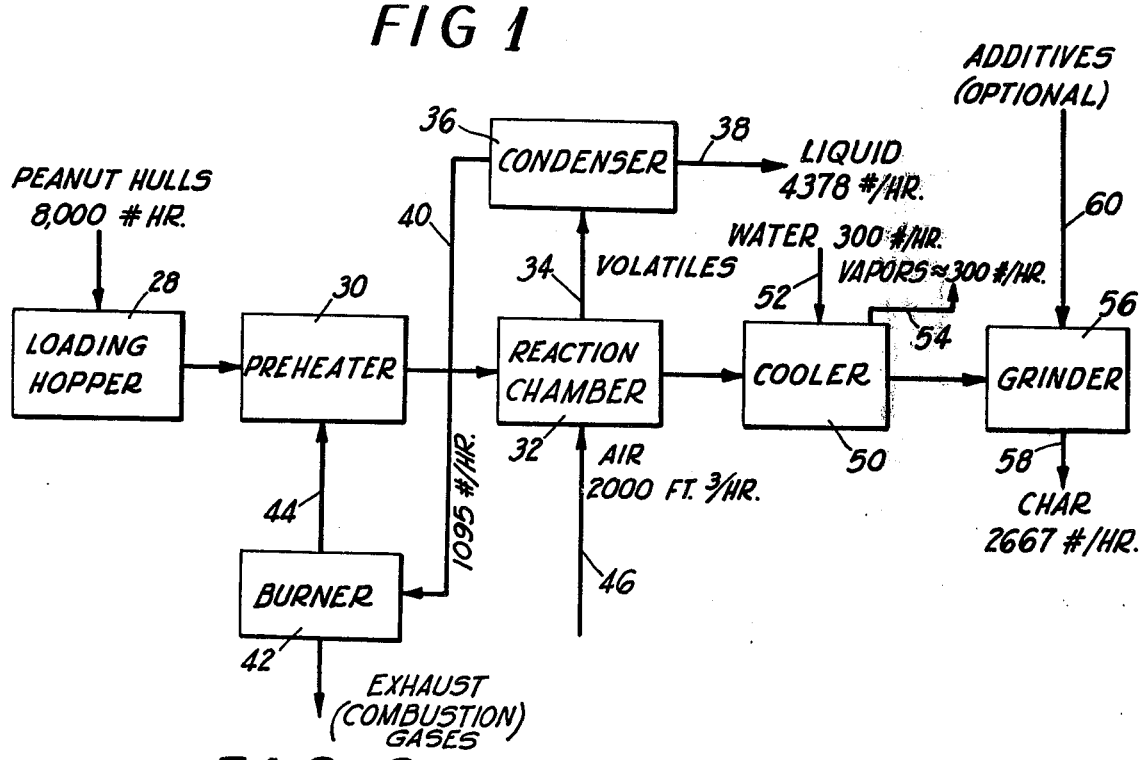
FIG. 2 is a flow diagram illustrating a continuous process of the system according to the invention.

A block diagram of apparatus for continuous production of char from peanut shells is shown in FIG. 2. In this Figure, reference character 28 illustrates a hopper-feeding device which continuously feeds the peanut shells at a rate of 2,000 pounds per hour through a preheating arrangement 30 from which the shells are passed to the reaction zone 32. The preheater 30 is optional, being primarily for the purpose of preliminary drying of the peanut shells. The partially oxidized off gases from the reaction zone are passed as indicated by the line 34 to a condensing device 36 wherein lighter volatiles or fractions which have not been condensed in the reaction chamber are condensed and removed as liquid in the line 38 at the rate of 4378 pounds per hour whereas the remainder of the partially oxidized off gases are passed through the line 40 at the rate of 1095 pounds per hour whereat oxidation thereof is completed so that the emission characteristics of any effluent products of combustion are nonpolluting. Air heated by the burner 42 is applied through the line 44 to the preheater 30. The carbonaceous residue from the reaction zone 32 is continuously passed to a cooler 50 into which water is sprayed or injected as indicated by the line 52 and vapor is removed as indicated by the line 54. After being cooled, the carbonaceous residue is passed to a grinder 56 from which the powdered or pulverized carbonaceous residue is discharged at a rate of 2667 pounds per hour as indicated by the line 58. At this point, additives such as binders or combustion promoting or starting additives may be added as indicated by line 60.

The preheater 30 preheats the peanut hulls to a temperature sufficient to dry them, and the decomposition of the hulls in the reaction chamber is commenced or initiated in any desired fashion whereafter the air injected into the reaction zone 32 at the rate of 2000 cubic feed per hour as indicated by the line 46 sustains the decomposition and elevates the reaction temperature as aforesaid. Typically, the temperature in the preheater will be at least on the order of 250° F. and the temperature of the carbonaceous residue discharged from the reaction zone 32 to the cooler 50 will be in a temperature range of 1800° F.

Based upon the flow rates indicated in FIG. 2 and as described above, the air is introduced into the reaction zone 32 at a rate of 0.25 cubic feet per pound of cellulosic material introduced into the reaction zone 32.

Figure 3:
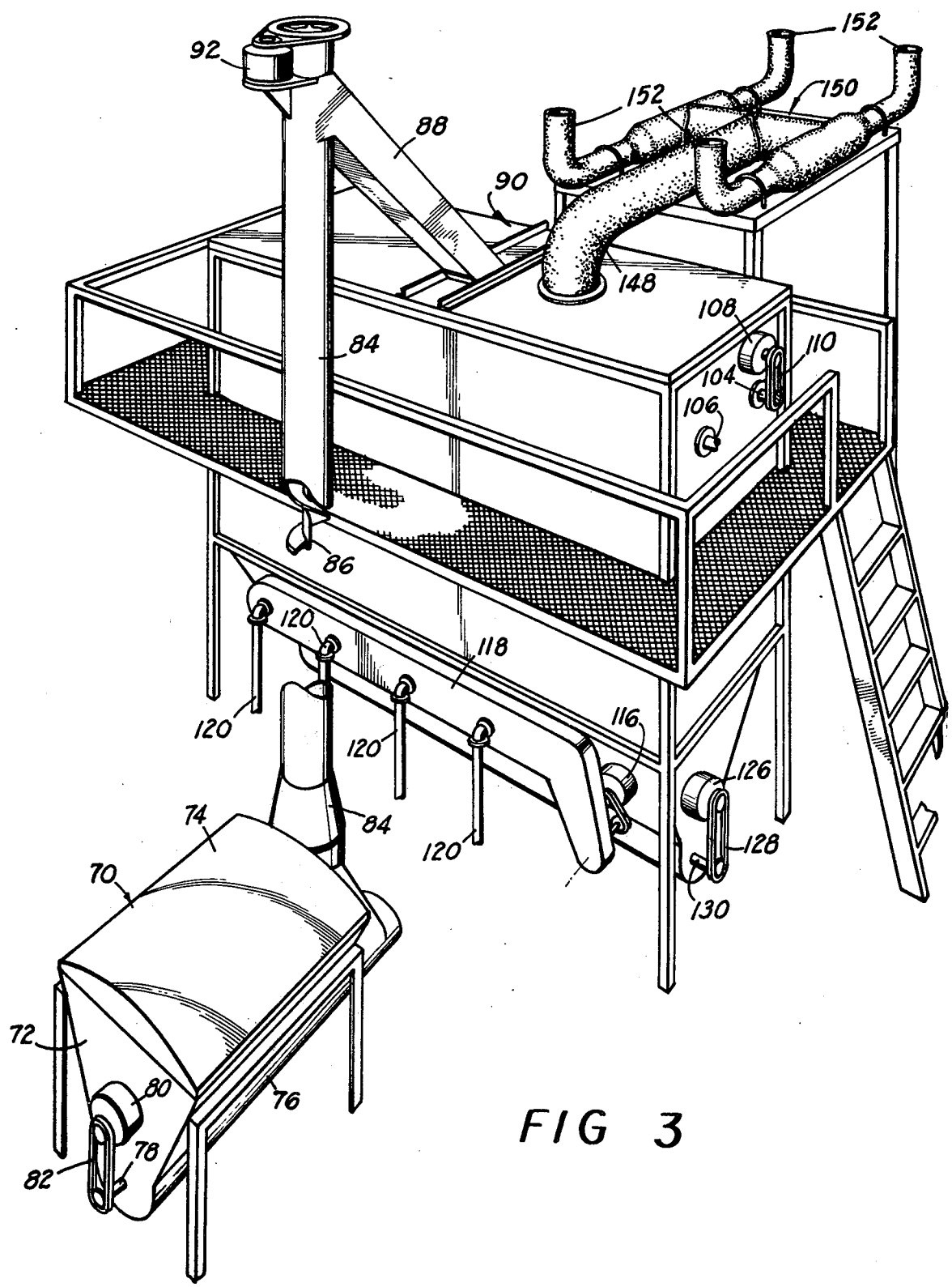
FIG. 3 is a perspective view partly broken away illustrating a preferred embodiment of the invention.
Figure 4:
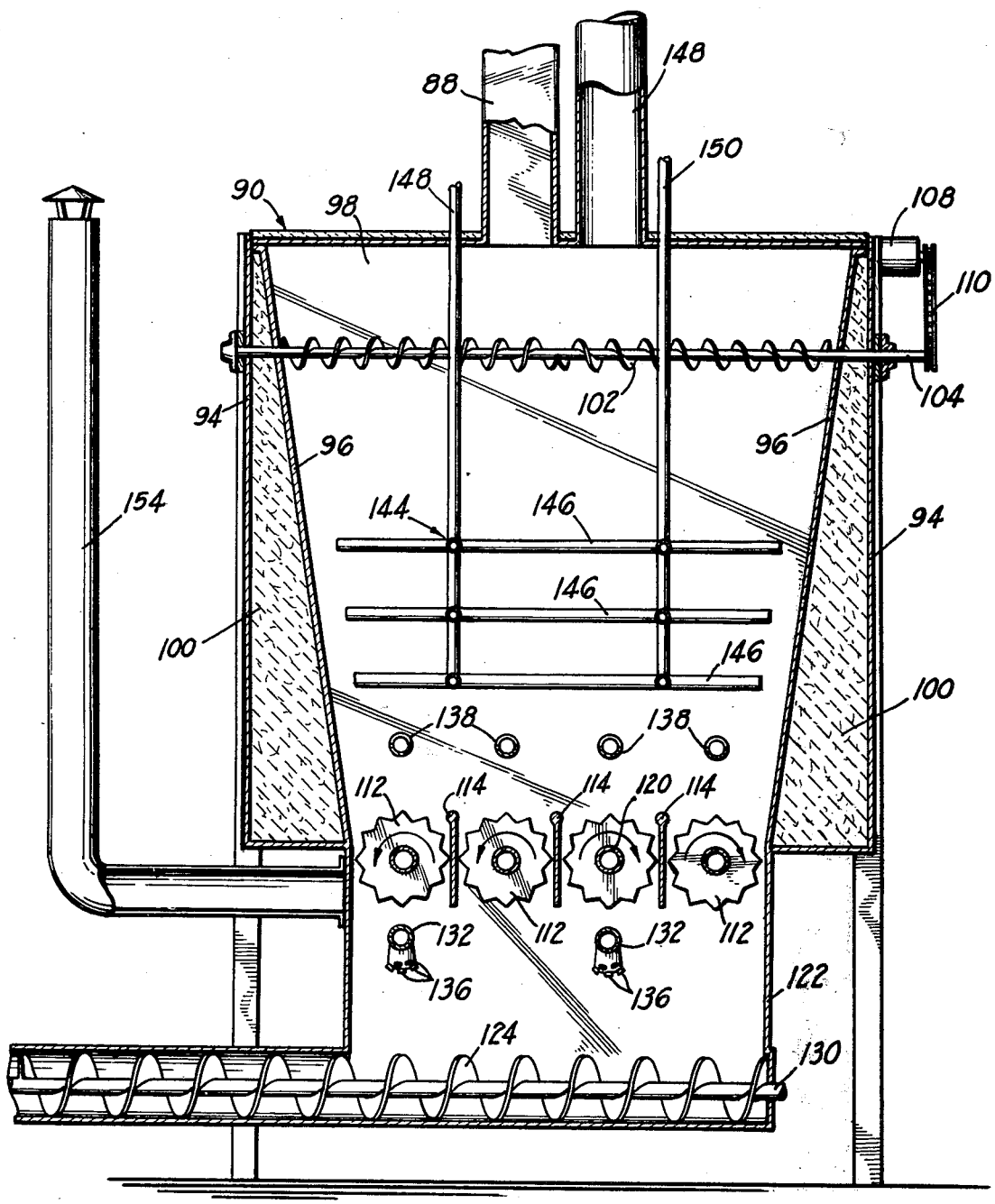
FIG. 4 is a vertical section taken through the embodiment shown in FIG. 3.
Figure 5:
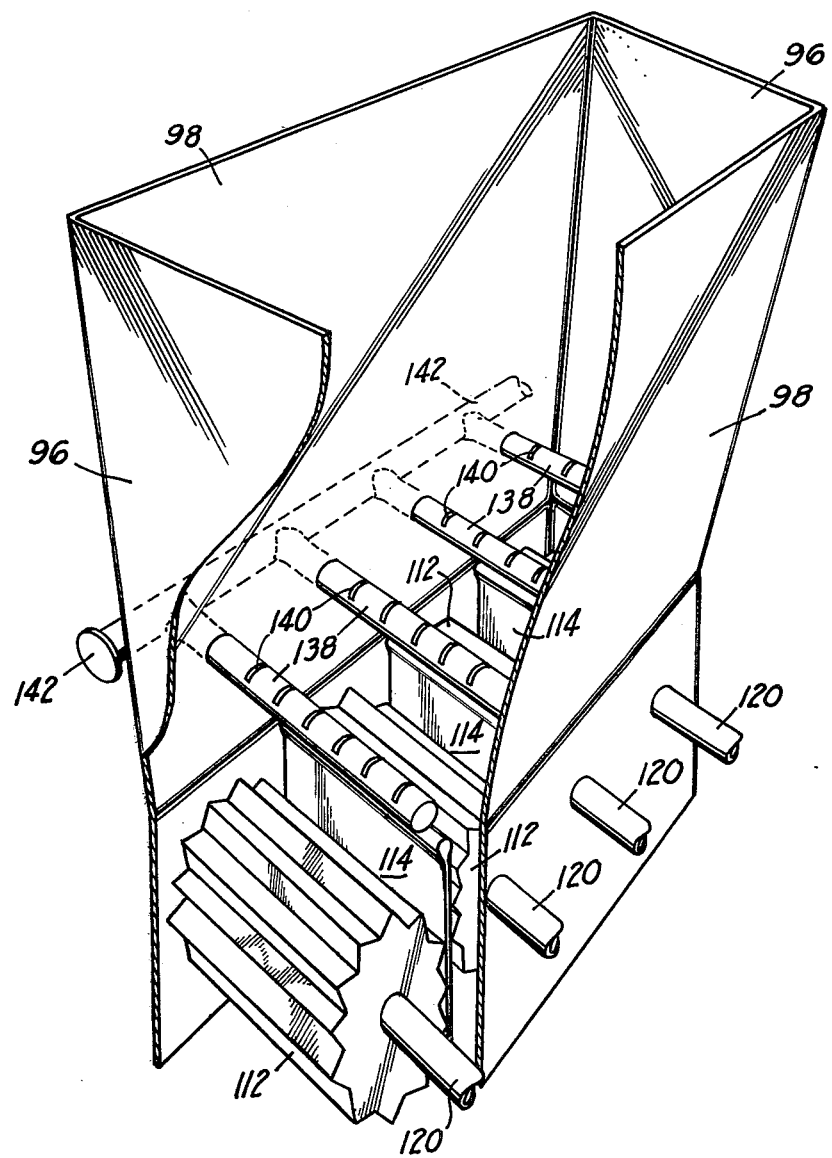
FIG. 5 is a perspective view partly broken away showing the chamber and related components of the embodiment shown in FIG. 3.

A preferred embodiment of the invention is illustrated in FIGS. 3–5 and is in the form of a continuous processing apparatus which may take the form of a stationary unit or alternatively may be constructed upon a suitable frame adapted to be moved from place to place as may be needed, in which event the frame is preferably supported by wheels so that the entire apparatus may be towed behind a suitable vehicle.

As illustrated in FIG. 3, the continuous processing apparatus consists essentially of the continuous feed supply 70 in the form of a hopper 72 provided with a removable cover 74, the bottom of the hopper being of trough-like form as indicated by the reference character 76 and housing therein an auger (not shown) whose shaft 78 is rotatably powered by means of the drive motor 80 coupled thereto by the chain 82. The vertically standing conveyor conduit 84 is connected at its lower end to the discharge region of the hopper auger to receive the peanut shells and this pipe or conduit is provided with the auger 86 for delivering the shells upwardly therethrough for delivery to the inclined chute 88 where the shells slide by gravity into the confines of the reaction chamber indicated generally by the reference character 90. The auger 86 is driven by the motor 92 mounted at the upper end of the conduit 84.

As is illustrated in FIG. 4, the reaction chamber assembly 90 includes the outer housing 94 within which is contained the reaction chamber member 96 whose general configuration is such as to present a reaction chamber 98 which converges generally downwardly as shown. Suitable insulating material 100 may be provided between the chamber 96 and the housing 94. The delivery chute 88 discharges at the top of the chamber 98 substantially centrally thereof and immediately below this region there is provided a pair or more of augers or spreaders 102 which are adapted to spread the peanut shells delivered to the top of the reaction chamber to form a more or less evenly distributed bed and to maintain a relatively even distribution of the shells to the top of the mass of shells contained within the reaction chamber 98. The drive shaft portions for these augers or spreaders are indicated in FIG. 3 by the reference characters 104 and 106, suitable drive mechanism being provided for these augers or spreaders by, as for example, the drive member 108 and chain drive 110 illustrated in FIG. 3 for the auger shaft 104.

The narrowed bottom of the reaction chamber 98 contains a series of discharge rollers or grate members 112 and intervening plates 114 which are adapted to control the discharge of the char or carbonaceous residue product from the reaction chamber. These rollers or grate members may be chain driven to rotate in the direction of the arrows in FIG. 4 and for this purpose a drive motor 116, as shown in FIG. 3, may be provided, the drive chain and suitable associated sprockets being housed within the cover member 118. The grate members or rollers are preferably hollow to provide for water cooling thereof, and for this purpose water inlet connections from the pipes 120 are provided to deliver cool water to the interior of the rollers and corresponding discharge conduits are connected to the opposite ends thereof, the details of which are not shown since such constructions are in themselves old and well known.

The bottom of the reaction chamber member 96 is formed as a discharge trough 122 within which the auger 124 is contained for receiving the discharged carbonaceous product and delivering it to a collection point. The auger 124 is provided with a drive motor 126 as shown in FIG. 3 coupled through the chain 128 to the drive shaft portion 130 of the auger. As mentioned hereinbefore, the carbonaceous residue product is discharged from the reaction chamber at a relatively elevated temperature well above that temperature at which such material wll ignite in the atmosphere outside the reaction chamber and to prevent such ignition of the product the water cooling spray tubes 132 are provided, same having the spray nozzle heads 134 for delivering a spray or mist of cooling water to the discharged product.

Above the rollers 112 and within the confines of the reaction chamber 98 proper there are provided a series of tubes or manifolds 138 which, as shown in FIG. 5, are slotted or apertured as at 140 and which lead to a common inlet manifold 142 connected to a source of air or other gas which is at a sufficient temperature to initiate the exothermic decomposition of the peanut shells within the reaction chamber 98 thereby to initiate the continuous process carried out therein. The destructive decomposition is sustained and the reaction temperature elevated by the air introduced through the grid of air supply tubes indicated generally by the reference character 144 in FIG. 4, the horizontal supply tubes 146 of which are provided with the series of openings for discharging the air within the reaction chamber in relatively evenly distributed fashion throughout the transverse extent thereof whereby to reach throu ghout the cross section of the reaction chamber. The air is supplied through suitable supply pipes 148 and 150 and the air so introduced is, of course, at a controlled rate such as only incompletely oxidizes the off gases as described hereinbefore to protect the carbonaceous product from any significant oxidization. The combustion product from the reaction chamber 98 are delivered through the flue 148 to the burner assembly indicated generally by the reference character 150. The burner assembly 150 is for the purpose of completing the oxidization of the combustion product and thereby to minimize any pollution which might otherwise occur. The burner in the form shown includes the four burner outlets 152 and it has been found that emission from the process may in this manner be controlled to be well below the required limit.

The steam generated by vaporization of the cooling water introduced through the spray heads 136 is conveyed from the collection chamber 122 through the exhaust stack 154 shown in FIG. 4.

Reaction temperatures as high as 2700° F. may be maintained within the reaction chamber 98 in the region thereof into which the air grid 144 discharges and this maximum reaction temperature as well as the residence time or throughput time of the product may be adjusted as desired to control the rate of production and as well as to control within limits the character and nature of the product produced. In this respect, it will be appreciated that the temperature gradient which exists between the region of maximum temperature and the top of the reaction chamber 98 controls the amount of volatiles which will be condensed in the upper regions of the reaction chamber. That is to say, the lower the temperature at which the combustion product exits through the flue 148, the greater the degree of condensation which will be produced. The heavier tars which do condense on the shells in the upper strata of the reaction chamber then migrate with the shells upon which they are condensed ultimately to the maximum temperature region of the reaction chamber whereby progressively to further decompose and carbonize these tars so as to build up the carbonaceous residue product and increase the yield of the process. In this connection, yields of about 35% are possible.

I claim:

1. In a process for the production of a high-carbon content carbonaceous residue product from a particulate cellulosic material, which material decomposes at elevated temperatures in an exothermic reaction, to produce a gaseous component containing a condensable fraction, and a less-readily oxidized solid component, the steps comprising:
   (a) introducing such cellulosic material into the upper end of a vertical reaction zone;
   (b) substantially continuously effecting the descent of said material, as a non-fluidized moving bed, within said zone and outwardly therefrom;
   (c) heating said material to effect its thermal decomposition, into said gaseous and solid components, in said zone;
   (d) introducing air at a flow rate in the order of 0.25 cu. ft. of air per pound of cellulosic material introduced in step (a) into the lower portion of said zone at a plurality of vertically-spaced locations partially to oxidize said gaseous component and raise the temperatures in said bed, and passing the resultant gas upwardly therethrough; and
   (e) controlling both the rate of descent of said bed through said zone and said flow rate of said air introduced thereinto, to:
      (1) sustain said thermal decomposition of said material, while avoiding complete oxidation of said gaseous component,
      (2) establish an upwardly decreasing vertical temperature gradient in said bed,
      (3) effect condensation of at least part of said condensable fraction upon said material near said upper end of said zone, and
      (4) effect substantially complete devolatilization of said solid component, so as to produce a substantially dry, devolatized carbonaceous residue product having an elemental carbon content in excess of about ninety percent by weight thereof and a surface area in excess of about 100 sq. meters per gram.

2. The method of producing an active carbonaceous product directly from a particulate cellulosic material of the type which decomposes at elevated temperatures in an exothermic reaction into a gaseous component containing a condensable fraction and a solid carbonaceous component which is less readily oxidized than said gaseous component, which comprises the steps of:
   (a) introducing the particulate cellulosic material into the top of a vertical reaction chamber while discharging incandescent carbonaceous product from the bottom of the reaction chamber at a temperature of about 1800° F., the introduction of material and discharge of product being controlled so as continuously to maintain a selected height of material in said reaction chamber while effecting controlled descent of material through a high temperature reaction zone confined to a lower region of said reaction chamber;
   (b) discharging all gases generated in said reaction chamber from the top thereof so that such gases make only a single upward pass through the material in said chamber;
   (c) sealing the bottom of the reaction chamber against the introduction of air therethrough by discharging said incandescent carbonaceous product into a confined space and spraying water onto said incandescent product to cool the product below that temperature at which it will burn in air and to generate a steam atmosphere within said confined space;
   (d) introducing air substantially uniformly into and substantially throughout said reaction zone at a rate in the order of 0.25 cubic feet of air per pound of cellulosic material introduced in step (a) such that all of the oxygen in said air is consumed by oxidation of a portion only of the gaseous component generated in said reaction zone; and
   (e) controlling the descent of material in step (a) with relation to the rate of air introduction in step (d) to create a decreasing temperature gradient from said reaction zone to the top of said selected height of material, which gradient causes condensation of a sufficient amount of the heavier components of said condensable fraction on the material between said reaction zone and said top of the material as to cause said product to have a carbon content in excess of about ninety percent by weight and a surface area in excess of about 100 square meters per gram.

* * * * *